Patented Jan. 13, 1942

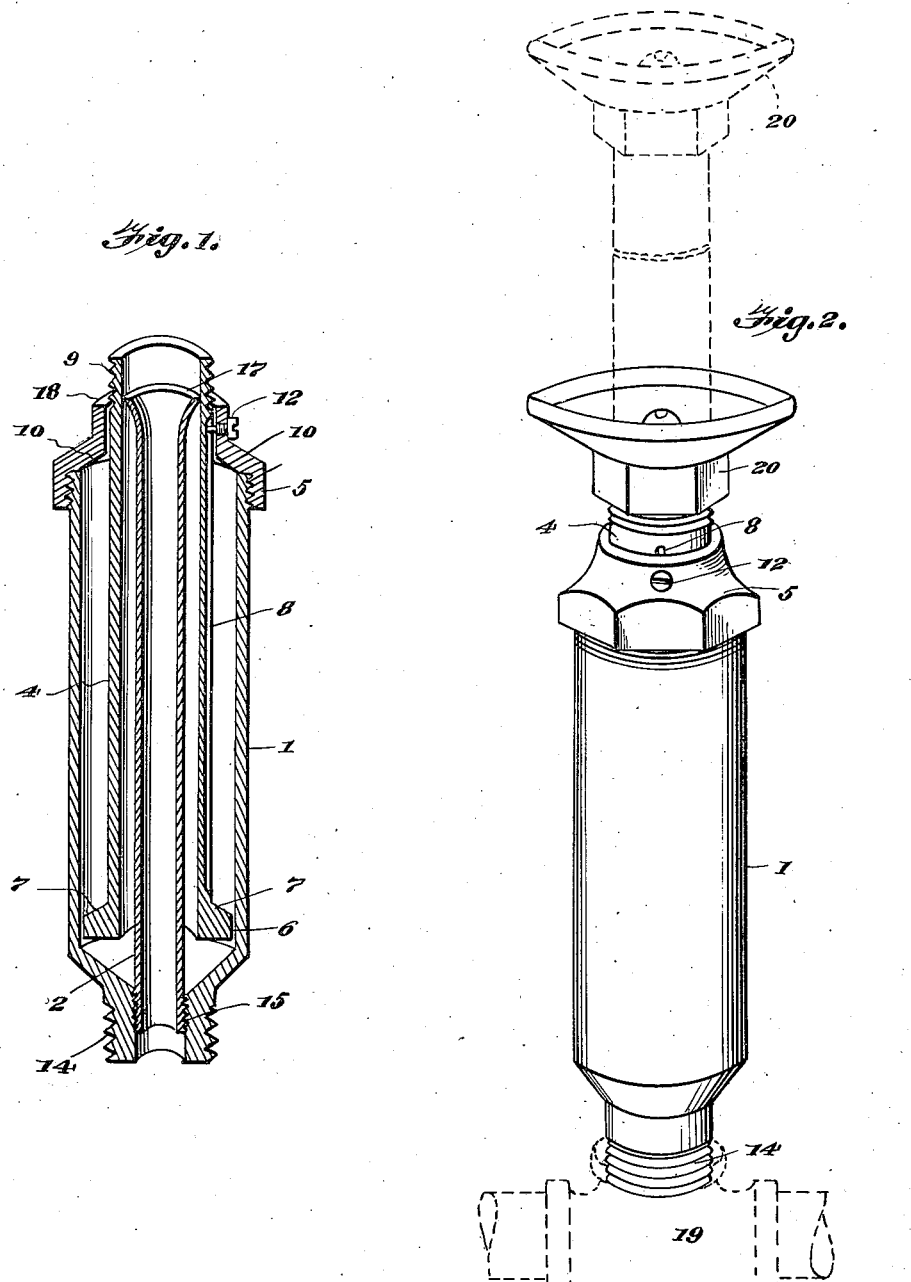

2,269,919

UNITED STATES PATENT OFFICE 2,269,919

LAWN SPRINKLER BODY

Harry A. Scherrer, San Diego, Calif.

Application March 6, 1940, Serial No. 322,493

4 Claims. (Cl. 299—61)

This invention relates to improvements in a lawn sprinkler body to be used for underground sprinkling systems, more particularly lawn sprinkling systems.

For the purpose of defining my invention more clearly in comparison with the present underground sprinkling systems, consisting of a short length of pipe (or nipple) connected to an underground water supply line and extending up to or above the surface of the ground or lawn, and having attached thereto a stationary conventional sprinkler head there are the following disadvantages.

If the sprinkler heads are placed below the grass so that a mowing machine can pass over them in cutting the grass, they will not spray properly when the water is turned on due to the obstruction of grass around them.

If they are attached to a longer pipe (or nipple) so as to be above the grass to overcome the above disadvantages they are an obstruction making it necessary to cut the grass around each head by hand.

In my invention I overcome all these disadvantages in the form of an automatic self-raising self-lowering sprinkler body to replace the short length of pipe (or nipple) between the underground water supply line and the sprinkler head. An object of my invention is to provide a device so that the sprinkler heads can be placed below the grass or ground level where they are practically invisible when not in operation, and will rise up through the grass automatically by water pressure when the water is turned on, and allow the sprinkler head to operate to its utmost efficiency and unobstructed returning automatically by gravity to their former lowered position when the water supply is shut off.

An important object of my invention is to provide a means for rendering the device leak-proof in operation and self-cleaning, and a means for preventing foreign matter such as grass and dirt from entering or obstructing the operation of the device due to the suction created when the supply line is shut off and water recedes, all this being done without the use of check valves, or receptacles or packing of any kind.

A further object of my invention is to provide a device of the above mentioned character which is simple in construction, cheap to manufacture, automatic in operation, and quickly and readily installed in any present lawn sprinkling systems, and can be used with any standard sprinkler heads that are now in common use.

Other objects and advantages of the invention will be apparent during the course of the following description.

In the accompanying drawing forming a part of this specification and in which like numerals are employed to designate like parts throughout the same:

Fig. 1 is a cross sectional view of my device in its entirety.

Fig. 2 is a perspective of my device and associated elements, namely the sprinkler head and fragmentary section of the water supply line.

In the drawing, wherein for the purpose of illustration is shown a preferred embodiment of my invention, referring to Fig. 1 (cross sectional view) the numeral 1 designates the cylinder member, and consists of a metal tube, preferably of brass and forms the main body of my device and is reduced in size at its lower end and is provided with threads at 14 so that it may be attached to the water supply line 19. The inside at this point is also provided with threads 15 to receive the overflow tube 2, which is also threaded at its lower end, which is a hollow metal tube preferably of brass, and is securely screwed into the cylinder 1, and is of such length to extend above the cylinder 1 and is of a larger diameter at the extreme upper end 17, giving it a flared appearance, and is of such diameter at this point as to fit loosely into the plunger tube 4, the object of this flare being to act as a jet to assist in raising the tube and sprinkler head 20, and also as an additional guide for the plunger tube 4. A further advantage of the tube 2 is that it acts as a check, allowing no water to be drained from the main cylinder 1, thereby excluding all foreign matter from entering the device around the tube 4 and the collar 18 of the cap 5 when the water in the supply line recedes due to drainage of the supply line on terraced or hill-side lawns.

Plunger tube 4 consists of a hollow metal tube preferably of brass, and is of such dimensions as to slidably fit into the cylinder 1 and over the overflow tube 2, and is of such length as to project above the cylinder 1, the tube 2 and the cap 5 when in its extreme lowered position and this plunger tube 4 is provided with threads 9 at this end to receive the sprinkler head 20. The opposite or lower end is provided with an integral projection 6 in the form of a hexagon, the corners of which act as a guide within the cylinder 1, and the flat portions allow water to escape around the tube 4, and has a beveled seat 7. This plunger tube 4 also has a groove 8 cut lengthwise beginning at a point just below the threaded portion 9, with the depth one-half the thickness of the wall of the tube 4 and a width sufficient to allow the pin portion of the retaining screw 12 to enter easily, its purpose being explained later in this specification.

The cap 5 is of metal, preferably of brass, is hexagonal in shape at the outer portion of the base, the base being of larger diameter than the cylinder 1, and threaded inside (female threads) so as to be screwed on to the cylinder 1. The inside beveled portion of the cap 5 forms the seat 10 to receive the seat 7 when in working position. The collar 18, which is open at the top and is integral with cap 5 is of such dimensions as to fit slidably over the plunger tube 4 and acts as a guide for the plunger tube 4 in its travel. The length of the collar is such as to allow for a hole which is threaded to receive the pin screw 12.

The pin screw 12, which is of metal, preferably of stainless steel and is of such size and dimensions as to be screwed into the hole, and having an integral pin or projection that extends a short distance beyond the inside opening of the wall of the cap 5 and into the groove 8 of the plunger tube 4 when screwed in place, its purpose being to keep the plunger tube 4 from rotating but will allow same to move freely up and down.

In applying my device to an underground sprinkling system, it first being understood that they can be made of any length and size so as to fit requirements, the cylinder 1 is screwed into the water supply line 19 by means of the threads 14. The overflow tube 2 is screwed into the cylinder 1 by means of the threads shown. The plunger tube 4 is then inserted in the cylinder 1 and over the overflow tube 2 with the hexagonal portion 6 of the plunger tube down, then the cap 5 is placed over the plunger tube 4 and screwed securely in place on the cylinder 1.

The pin screw 12 is then inserted in the threaded hole 11, the pin portion of the screw 12 entering the groove 8 of the plunger 4. A sprinkler head 20, which can be of any conventional type is now screwed onto the projecting portion of the plunger tube 4 which is threaded (at 9) to receive the sprinkler head 20.

In operation, when water is turned into the supply line 19, it enters the device through the tube 2 and into the plunger tube 4, a small amount escaping through the sprinkler head 20, and around the outside of the tube 2, flowing down the inside of the plunger tube 4 into the cylinder 1. It then flows up around the hexagonal portion 6 and up the outside of the plunger tube 4 and escapes through the cap 5, which is a loose fit, washing away any particles of grass or foreign matter.

As soon as the water has reached a pressure sufficient to overcome the weight of the tube 4 and the sprinkler head 20, the tube and head rise until the seat 7 of the plunger tube 4 and the seat 10 of the cap 5 come in contact, thereby sealing the device so that no more water can escape around the plunger tube 4, thus passing through the sprinkler head only.

When the water is shut off the supply line 19, the pressure is reduced, and the plunger tube 4 and the head 20 are lowered by gravity due to their combined weight. As soon as the seat 7 of the plunger tube 4 leaves the seat 10 of the cap 5 excess water is again forced out around the plunger tube 4 and the cap 5 due to the displacement of the plunger tube in the cylinder 1, thereby cleaning or washing away all foreign matter on the entire downward travel, but leaving cylinder 1 full of water.

The water in the tube 2 can recede or drain back into the supply line 19 without causing a suction or vacuum around the collar 18 of the cap 5 so that no foreign matter can be drawn back into the device which would interfere with its operation.

Another very important object of the groove 8 and the screw 12 is to keep the sprinkler heads that are designed to be used near walks, etc. and known as half heads and quarter heads from turning.

It is understood that the form of my invention herewith shown and described is to be taken as a preferred example of the same and that various changes in the shape, size and arrangements of parts may be resorted to without departing from the spirit of the invention or the scope of the subjoined claims.

I claim:

1. An automatic self-cleaning sprinkler comprising a hollow body, a hollow plunger member slidably mounted for longitudinal movement within the hollow body, an overflow tube carried by the body and extending longitudinally of the hollow plunger member, closure means for the outer end of the body arranged in spaced relation around the hollow plunger member for providing a flushing opening, the hollow plunger member being slidably mounted through the closure member, the plunger member having a flange at one end working within the body and adapted to force water from the body out through the flushing opening in the closure member as the plunger member moves in one direction and also adapted to force water out through the flushing opening in the closure member as the plunger member slides in an opposite direction within the body through the medium of displacing the water within the body.

2. An automatic self-cleaning sprinkler of the class described comprising a hollow body, an overflow tube connected to the body and extending longitudinally thereof, a hollow plunger member slidably mounted within the body, the overflow tube extending into the plunger and having a flared outer end loosely fitting within the plunger, a closure member for the body slightly spaced from the plunger to provide a flushing opening, the flared outer end of the overflow tube being located within the area of the closure member, the flared outer end constituting a jet for flaring the water outwardly, a sprinkler head carried by the plunger member and adapted to be engaged by the water from the overflow tube for raising the plunger member and head, the flared outer end also providing a guide for the plunger member adjacent the closure member to retain the plunger member in spaced relation from the closure member as the plunger member moves longitudinally, guiding means carried by the lower end of the plunger member and contacting the side walls of the body, means for holding the plunger member against rotation, the flushing opening being adapted to permit water to be automatically ejected from the body as the plunger member is raised, and the plunger member being adapted to automatically displace water from the body through the flushing opening as the plunger member is lowered.

3. An automatic self-cleaning sprinkler of the class described comprising a hollow body, an overflow tube connected to the body and extending longitudinally thereof, a hollow plunger member slidably mounted within the body, the overflow tube extending into the plunger and having a flared outer end loosely fitting within the plunger, a closure member for the body slightly spaced from the plunger to provide a flushing opening, the flared outer end of the overflow tube being located within the area of the closure member, the flared outer end constituting a jet for flaring the water outwardly, a sprinkler head carried by the plunger member and adapted to be engaged by the water from the overflow tube for raising the plunger member and head, the flared outer end also providing a guide for the plunger member adjacent the closure member to retain the plunger member in spaced relation from the closure member as the plunger member moves longitudinally, guiding means carried by the lower end of the plunger member against rotation, the flushing opening being adapted to permit water to be automatically ejected from the body as the plunger member is raised, the plunger member being adapted to automatically displace water from the body through the flushing opening as the plunger member is lowered, said flange being hexagonal in shape and defining alternate corners and flat portions, the corners being adapted to contact the inner face of the body, and the flat portions providing ports to facilitate the passing of water from a point below the flange to a point above the flange.

4. An automatic self-cleaning sprinkler of the class described comprising a hollow body, a stationary overflow tube fixedly secured to the body and extending longitudinally thereof, the overflow tube having a flared outer end, a hollow plunger member slidably mounted within the hollow body, the overflow tube extending longitudinally of the hollow plunger member, a cap secured to the body and surrounding the hollow plunger member and being spaced therefrom to provide a flushing opening, the cap having a beveled outer face being inclined downwardly and outwardly of the center of the body to provide a shedding surface and to direct accumulated material away from the body as water flows out through the flushing opening, a sprinkler head carried by the hollow plunger member, the pressure of the water passing through the overflow tube being adapted to move the hollow plunger member outwardly of the body, and means carried by the hollow plunger member and working within the body for forcing water out through the flushing opening as the hollow plunger member is moved outwardly of the body and also causing water to be flushed out through the flushing opening as the hollow plunger member moves inwardly of the body and displaces water from the body.

HARRY A. SCHERRER.